United States Patent [19]
Merrill

[11] 3,868,346
[45] Feb. 25, 1975

[54] HEAT RESISTANT POLYMERIC COMPOSITIONS
[75] Inventor: Edward W. Merrill, Cambridge, Mass.
[73] Assignee: High Voltage Engineering Corporation, Burlington, Mass.
[22] Filed: Dec. 14, 1972
[21] Appl. No.: 315,102

Related U.S. Application Data
[60] Continuation-in-part of Ser. Nos. 107,570, Jan. 18, 1971, abandoned, and Ser. No. 233,935, March 3, 1972, Pat. No. 3,774,623, which is a division of Ser. No. 888,505, Dec. 29, 1969, Pat. No. 3,679,625.

[52] U.S. Cl. ...... 260/37 SB, 131/17 R, 204/159.13, 260/45.7 R, 260/46.5 G
[51] Int. Cl. ............................................. C08g 51/04
[58] Field of Search ....... 260/46.5 G, 45.7 R, 37 SB

[56] References Cited
UNITED STATES PATENTS
3,146,799  9/1964  Fekete ........................ 260/46.5 G OTHER PUBLICATIONS
The Condensed Chemical Dictionary, 7th Edition, pp. 130 and 857.

Primary Examiner—Melvyn I. Marquis
Attorney, Agent, or Firm—Kenway & Jenny

[57] ABSTRACT

Fire retardant compositions are formed by admixing a silicone rubber with a hydrated alkali metal borate in amounts sufficient to form a vitreous composition when the borate is heated to its melting temperature and the silicone is thermally decomposed to form silica. The compositions are useful as insulators, which when heated, evolve only non-toxic gases and form a high melting vitreous layer which acts as a heat resistant protective coating.

8 Claims, No Drawings

3,868,346

HEAT RESISTANT POLYMERIC COMPOSITIONS

REFERENCE TO RELATED APPLICATIONS

This application is a continuation-in-part of application Ser. No. 107,570, filed Jan. 18, 1971 and now abandoned and application Ser. No. 233,935, filed Mar. 3, 1972 now Pat. No. 3,774,623 which in turn is a divisional application of Ser. No. 888,505, filed Dec. 29, 1969, now U.S. Pat. No. 3,679,625, issued July 25, 1972.

BACKGROUND OF THE INVENTION

This invention relates to heat resistant silicone compositions containing a filler comprising a hydrated borate which, upon melting reacts with silica to form a glass composition.

Present insulating compositions formed from natural or synthetic polymeric materials, for example compositions employed to insulate electrical wiring, are undesirable since they decompose to form vaporous or gaseous products when heated to ignition temperatures and therefore cannot isolate the source of heat. Furthermore, in many instances, the products of combustion are toxic and create safety problems during attempts to extinguish the combustion. It has been proposed to admix filler materials which have high ignition or melting temperatures such as asbestos with the polymeric material to reduce its ignition temperature or to admix a material which interacts with the polymeric material to reduce its tendency to oxidize. While these proposals are somewhat successful, the degree of success is temperature-dependent so that when high temperatures are encountered, the composition will decompose thereby destroying its structural properties and usefulness as an insulator.

It has been proposed in Belgian Pat. No. 716,757 to employ alkali metal borates, particularly sodium tetraborate decahydrate (borax) as a filler in polymeric compositions. Even though improved fire retardancy is obtained, all of the polymers disclosed will decompose to vaporous products at elevated temperatures thereby destroying their structural properties and in many instances will evolve toxic gases during combustion.

It would be highly desirable to provide a composition which, at elevated temperatures, is structurally stable, does not evolve toxic gases and is capable of forming a vitreous composition which can isolate a heat source from combustible materials.

BRIEF DESCRIPTION OF THE INVENTION

The present invention is based upon the discovery that when a hydrate of an alkali metal borate is admixed with a silicone polymer under conditions to retain the water of hydration of the borate, the resultant composition has a high heat capacity, does not form toxic combustion products upon heating, and is capable of forming a water-insoluble vitreous composition, by which a source of heat causing combustion can be isolated. The composition of this invention comprises a silicone polymer or copolymer and a hydrated alkali metal borate which evolves water of hydration upon heating, melts at a temperature below the temperature at which the silicone is decomposed to silica and in its melted state reacts with silica to form a water-insoluble glass. In one aspect of this invention the silicone-borate composition also can contain a silica filler which improves the initial structural characteristics of the composition and with which the metal borate can react to form a borosilicate glass prior to or during silicone decomposition.

DESCRIPTION OF SPECIFIC EMBODIMENTS

In formulating the borate and the silicone, it is necessary only to mix the borate and silicone together but at a temperature lower than where initial dehydration of the borate occurs. Subsequently, the silicone-borate composition can be formed in any desired shape and crosslinked such as by exposure to ionizing radiation in the desired final form. When employing low molecular weight silicones which can be shaped without the application of heat, the borate and silicone are merely contacted and mixed as for example by kneading. With higher molecular weight silicones, the silicone is admixed with a solvent to plastize the silicone so that it can be admixed with added borates. If desired, a solvent also can be added to the low molecular weight silicone which is somewhat plastic even at room temperature. The silicone-borate mixture then is treated to evaporate the solvent but at a temperature below which dehydration of the borate occurs and the resultant composition then can be cut to be desired shape. Alternatively, when a silicone, formable at room temperature is admixed with the borate, it can be formed as for example by extrusion into a desired shape and then subjected to ionizing radiation to cure the silicone so that it retains its extruded shape. In one application, the borate-silicone composition can be extruded around a wire to form a coating thereon and then subjected to ionizing radiation to form a crosslinked silicone-borate coating.

The compositions of this invention resist the effects of heat first by puffing as water is evolved from the borate molecule and an alkali metal borate solution is formed. When heating is continued to increase the temperature of the borate, additional water is vaporized, the viscosity of the borate increases and the silicone is decomposed to water, carbon dioxide and silica. This silicone decomposition begins to occur at a temperature at which the alkali metal borate reacts with the silica and when reaction occurs, a high melting borosilicate glass is formed which retains its structure even at highly elevated temperatures. The borate should have a sufficiently low melting point so that reaction of the borate and silica occurs prior to substantial loss of the shape of the silicone due to silicone decomposition. It is this glass composition when interposed between a heat source and undecomposed silicone which prevents further decomposition of the silicone and provides protection against heat for the article which is coated with the silicone-borate composition. For example, when used as an insulating coating for electrically conductive wire which becomes heated, the borosilicate glass can isolate the heated wire from any adjacent combustible material. Thus, substantial advantages are obtained with the composition of this invention in that the gaseous products of decomposition are nontoxic and a heat-resistant coating is formed on any remaining silicone to protect the article coated and inhibit further decomposition of the silicone.

The compositions of this invention also can be admixed with tobacco to absorb polynuclear aromatic hydrocarbons (PAH) while effectively preventing the re-emission (desorption) of the absorbed PAH as the flame front passes by or when the material is heated by the hot gases in the filter section of a cigarette. Desorption is prevented effectively since the borate is capable of decomposing with the evolution of water thereby controlling the temperature of the silicone-borate composition below the PAH desorption temperature and if that temperature is exceeded, the borate will melt to form a vitreous surface layer on the silicone composition which effectively prevents PAH desorption.

Suitable borates which can be employed are those which evolve water of hydration when heated and which, after evolving all its water of hydration, can be melted to react with silica derived from the silicone prior to substantial loss of the shape of the silicone composition due to silicone decomposition. Exemplary suitable borates include sodium tetraborate decahydrate (borax), sodium tetraborate pentahydrate, lithium pentaborate octahydrate, or the like, with borax being preferred. The borate can be incorporated easily into the silicone when having a particle size normally employed for fillers in polymeric compositions.

Silicones suitable in the present invention are those capable of being polymerized to form structurally stable compositions and which do not evolve toxic gases or vapors when oxidized at elevated temperatures. Suitable silicones include poly-dimethyl siloxane, polydimethyl co-vinyl-methyl-siloxane, poly-dimethyl co-phenyl-methyl-siloxane and interpolymers of di-methyl silanols, methyl-vinyl-silanols, phenyl-methyl-silanols and diphenyl silanols and the like.

The composition of this invention also can contain a silica filler which improves the initial structural characteristics of the composition and with which the metal borate can react to form a borosilicate glass prior to or during silicone decomposition. Furthermore, materials which react with borate and silica to form various borosilicate glass can be incorporated in the silicone. Suitable materials include the reactive metal oxides such as calcium oxide, barium oxide, lead oxide, zinc oxide, aluminum oxide or the like or metal salts which decompose upon heating to form the corresponding reactive metal oxide such as calcium carbonate, magnesium carbonate or the like.

The following examples illustrate the present invention and are not intended to limit the same.

EXAMPLE I

| | |
|---|---|
| Silicone liquid pre-polymer (Dow-Corning Silastic 881 with curing agent, commonly designated as RTV) | 25 grams |
| Borax | 75 grams |
| Diethyl Ether | 50 grams |

The above ingredients are thoroughly mixed and then spread on a glass plate to a thickness of about 0.5 mm. Following evaporation of the ether, the material cures spontaneously over a period of a few hours at room temperature and then is cut into flakes about 5 mm. in length and 1 mm. wide.

These flakes may be mixed in proportions of about half and half by volume with tobacco, and smoke as a cigarette, pipe and cigar.

After smoking the ash, the remnants of the absorbent may be retrieved easily. No deleterious smoke flavor can be noted and the retrived particles will be found to possess the polymeric silicone rubber intact within a shell of apparently vitreous material.

EXAMPLE II

In preparing especially pure quantities of borax-filled silicone, it is preferred to employ a silicone prepolymer having inert terminal groups, which may be crosslinked by ionizing radiation. A suitable procedure is to mix

| | |
|---|---|
| Silicone rubber stock HMW linear polydimethyl-siloxane (Dow-Corning Food Grade Gun Stock Silastic S-2000 U) | 1 part by wt. |
| Diethyl Ether | 3 volumes per volume |
| Borax, CP grade, through 100 mesh, (Tyler Screen) | 3 parts by wt. |

Swell the silicone stock in ether for 3 days, then add the borax and knead well. Let the kneaded mixture stand for 1 day and then pass through a household hamburg meat grinder four times to mix thoroughly and allow ether to evaporate. The shreds thus formed are dried in air at room temperature for eight hours to evaporate the ether, then spread into a ⅛ inch thick layer and exposed to an electron accelerator (Van der Graaff generator) at 10 megarads of radiation. The product is then ground and shredded to flakelike particles about 2–5 mm. long by about 0 mm. thick and 0.5–2 mm. wide. These may be mixed with tobacco in amounts of .25 parts by wt. per part tobacco and will serve to absorb, substantially irreversible, PAH components from the smoke.

Particles of this relatively large size, as compared with conventional absorbents or filler, are preferred because they appear better to resist degradation from the heat of the burning tobacco, and to vitrefy as described above into elastic-cored hard shells more effectively than finer particles. In addition, larger amounts of absorbent may be incorporated if the particles are coarse. For instance, if the absorbent is comminuted to 100 mesh, only about 20 percent by weight (based on the total weight of absorbent plus tobacco) of absorbent can be added; more only serves to prevent combustion — and the removal of PAH is less effective as these small particles appear not to resist the heat as well, when admixed with the tobacco that is burned.

The borax-filled silicone rubber herein described may be incorporated in the filter section of a cigarette, where it if effective to resist thermal degradation and desorption of PAH particularly as the "front" or tobacco end of the cigarette where heating is greatest. In this configuration highly comminuted material, e.g. through 100 mesh is to be preferred because of its high surface to volume ration.

Tests conducted thus far indicate that very substantial amounts of tar may be removed from the tobacco gas smoke by borax-filled-silicone without appreciable adverse effect to the taste of the smoke.

EXAMPLE III

One hundred parts of borax (screened through a 100 mesh sieve) were blended into a dough consisting of 50 parts of Dow Corning S-2000-U silicone gum diluted by prior kneading with 100 parts of ether.

The resulting stiff paste was extended as a coaxial sheath around a number 8 copper conductor which had been previously extrusion-coated with a 20 mil wall thickness silica-filled silicone rubber compound. The borax-silicone coating as extruded had an outside diameter of 0.350 inches.

After air evaporation of the ether solvent, which caused shrinkage to an outside diameter of 0.250 inches, the assembly was irradiated continuously under a Van der Graaff generator operating at 3.5 Mev, at such a rate as to deliver a dose of 10 megarads.

The completed, double-sheathed cable was tested in the following ways:

1. The sheathed cable was exposed to an external flame source (Bunsen gas burner). The exterior borax-silicone coating puffed where exposed to flame expanding to roughly twice the original diameter. Continued heating with the Bunsen burner to near red heat caused gradual vitrification and some consolidation of the coating. At no time was a flame detectable around the coating, nor was any significant odor detectable. No smoke was evolved during this test. Upon cooling, the copper conductor was found to be encased in a glassy, hard, white layer comprising a silica borate glass.

2. An 18 inch length section of the above cable was clamped horizontally between two electrodes of an arc welder in room air. It was subjected to a near short circuit current of 1,000 amperes, producing a power dissipation of 600 watts per foot initially. The borax-silicone coating was observed to puff and expand with evolution of steam and then to vitrify and shrink somewhat. The current was cut when the assembly neared a temperature of about 800° C. No smoke was evolved nor was any significant odor noted. Upon cooling, the copper conductor was found to be covered by a hard whitish glassy coating. Suitable fire retardancy of the heat resistant composition is attained when the borate constitutes between about 50 and 80 percent by weight of the composition.

I claim:

1. A heat resistant composition comprising a silicone polymer which polymer does not evolve a toxic gas or vapor when oxidized at elevated temperatures and an alkali metal borate hydrate intimately admixed, with the borate retained within said silicone, said borate having a melting point below the temperature wherein substantial thermal decomposition of the silicone occurs and being reactive with silica to form a borosilicate glass, the concentration of said borate being sufficient to render the composition fire retardant and being between about 50 and 80 percent by weight of said composition.

2. The composition of claim 1 wherein the borate is borax.

3. The composition of claim 1 which contains a silica filler.

4. The composition of claim 2 which contains a silica filler.

5. The composition of claim 1 wherein the silicone polymer is crosslinked.

6. The composition of claim 2 wherein the silicone polymer is crosslinked.

7. The composition of claim 3 wherein the silicone polymer is crosslinked.

8. The composition of claim 4 wherein the silicone polymer is crosslinked.

* * * * *